United States Patent
Voss et al.

(10) Patent No.: US 7,237,406 B2
(45) Date of Patent: *Jul. 3, 2007

(54) CONDENSER/SEPARATOR AND METHOD

(75) Inventors: Mark G. Voss, Franksville, WI (US); Liping Cao, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 310 days.

This patent is subject to a terminal disclaimer.

(21) Appl. No.: 10/935,069

(22) Filed: Sep. 7, 2004

(65) Prior Publication Data
US 2006/0048540 A1   Mar. 9, 2006

(51) Int. Cl.
| F25J 1/00 | (2006.01) |
| F25B 39/04 | (2006.01) |
| F28B 3/00 | (2006.01) |
| F28B 9/10 | (2006.01) |
| H01M 8/04 | (2006.01) |
| H01M 8/12 | (2006.01) |

(52) U.S. Cl. .......................... 62/606; 62/509; 165/111; 165/114; 429/26

(58) Field of Classification Search ................. 62/606, 62/509; 165/110, 111, 114; 429/26
See application file for complete search history.

(56) References Cited

U.S. PATENT DOCUMENTS

| 1,908,463 | A | * | 5/1933 | Torrance ..................... 165/113 |
|---|---|---|---|---|
| 2,274,034 | A | * | 2/1942 | Broadhurst ................... 62/311 |
| 4,190,102 | A | * | 2/1980 | Gerz .......................... 165/113 |
| 4,372,759 | A | | 2/1983 | Sederquist et al. |
| 4,473,110 | A | * | 9/1984 | Zawierucha ................. 165/133 |
| 4,530,886 | A | | 7/1985 | Sederquist |
| 4,815,296 | A | * | 3/1989 | Amir ........................... 60/651 |
| 4,973,530 | A | | 11/1990 | Vanderborgh et al. |
| 5,096,543 | A | | 3/1992 | Elmore |
| 5,752,566 | A | | 5/1998 | Liu et al. |
| 5,755,113 | A | * | 5/1998 | Ferguson et al. ............. 62/474 |
| 5,765,631 | A | * | 6/1998 | Gerard ........................ 165/166 |
| 6,582,843 | B1 | | 6/2003 | Heuser et al. |
| 7,051,540 | B2 | * | 5/2006 | TeGrotenhuis et al. ........ 62/93 |
| 7,111,673 | B2 | * | 9/2006 | Hugill ......................... 165/166 |
| 2003/0011721 | A1 | | 1/2003 | Wattelet et al. |
| 2003/0183374 | A1 | | 10/2003 | Voss et al. |
| 2005/0229553 | A1 | * | 10/2005 | TeGrotenhuis et al. ........ 55/319 |
| 2006/0016215 | A1 | * | 1/2006 | Tonkovich et al. ........... 62/617 |

* cited by examiner

Primary Examiner—William C. Doerrler
(74) Attorney, Agent, or Firm—Micheal Best & Friedrich LLP

(57) ABSTRACT

A condenser (10) and method for separating a fluid flow is provided. The condenser (10) maybe used for separating a cathode exhaust flow (60) into a condensed liquid (86) and a non-condensed gas (70). The condenser (10) includes a vertical inlet (14), a vertical outlet (16), a gas flow path (20), a liquid flow path (22), a non-condensed gas outlet (24) and a condensed liquid outlet (26).

34 Claims, 3 Drawing Sheets

CONDENSER/SEPARATOR AND METHOD

FIELD OF THE INVENTION

This invention relates to condensers for separating a fluid mixture into a non-condensed gas and a condensed liquid, and in more particular applications, to such condensers as used in connection with fuel cell systems.

BACKGROUND OF THE INVENTION

Condensers are used in a variety of situations for at least partially condensing a liquid from a fluid mixture. Many condensers, such as those found in automobiles, condense an entirely vapor flow into an entirely liquid flow. Typically, in such condensers, the fluid is a vapor at the inlet and a condensed liquid at the outlet. However, there are also condensers that only partially condense a fluid or condense only one constituent of gas mixture whereby the outlet contains both liquid and gas.

Condensers are also useful in a variety of other applications for recovering a liquid from an exhaust stream. One specific example of where such a condenser may be employed is in combination with a fuel cell system for recovering water from the cathode exhaust of the fuel cell. Specifically, the cathode exhaust from a polymer electrolyte membrane (PEM) fuel cell contains water that was input into the system for humidification as well as water that was produced by the electrochemical reactions within the fuel cell itself.

Most PEM fuel cells combine hydrogen gas on the anode side with oxygen on the cathode side to create water while harnessing electrons to create electricity. The reaction on the anode side of the fuel cell is $[H_2 \rightarrow 2H^+ + 2e^-]$. The hydrogen ions permeate across the separating membrane while the electrons pass through an electronic circuit over to the cathode side. At the cathode side of the fuel cell the reaction is $[2H^+ + 2e^- + \frac{1}{2}O_2 \rightarrow H_2O]$ whereby the hydrogen ions, electrons and oxygen combine to create water. Therefore, the overall reaction theoretically produces one molecule of water per molecule of hydrogen.

Furthermore, fuel cells generally require water, in the form of humidification, for optimal performance of the membrane used in each fuel cell. Typically, one or both sides of the fuel cell, the anode and the cathode, are humidified via the respective inlet flows to maintain the hydrogen ion permeation from the anode to the cathode. Generally, air is utilized as the source of oxygen for the electrochemical reaction on the cathode side of the fuel cell, and for that reason a significant amount of water must also be used to maintain the appropriate level of humidification. A significant amount of water is required because the flow rate of air required is generally large compared to a pure oxygen flow to achieve the reaction required amount of oxygen, and/or because water overspray may be required and collected at cathode exhaust. Therefore, the fuel cell itself requires a significant amount of humidification to operate.

As alluded to previously, the fuel cell creates water as a product of the electrochemical reaction. Therefore, not only does the cathode exhaust have water from the inlet humidification, but the fuel cell produces water as well. To maximize the efficiency of the fuel cell system, it is desirable to recover the water from the cathode exhaust to use for humidification and/or for cooling in other parts of the fuel cell system.

In this regard, condensers are frequently employed to recover water from the cathode exhaust. Because the temperature of the condensed and entrained water may be higher than the desired temperature, others have chosen to combine a condenser in series with a liquid cooler.

However, using a condenser in series with a liquid cooler contributes to pressure drops through the multiple units. Additionally, even with an upstream water separator, the pressure drop can be too great, possibly requiring additional pumps. These additional pumps add to overall parasitic losses and decrease overall system efficiency. Additionally, multiple units require additional space. As fuel cell systems attempt to become smaller and smaller for automobile applications and the like, it is desirable to provide a smaller condensing unit. Therefore, there exists the need for a cathode exhaust condenser, a liquid/gas separator and liquid cooler that minimize gas pressure losses and/or minimize overall space requirements

SUMMARY OF THE INVENTION

In accordance with one feature of the invention, a condenser is provided for separating a fluid mixture into a condensed liquid and a non-condensed gas. The condenser includes a vertical inlet manifold to receive the gas mixture, a vertical outlet manifold, a gas flow path fluidly connected to the inlet manifold and the outlet manifold to direct a gas flow from the inlet manifold to the outlet manifold in heat exchange relation to a cooling fluid flow, and a liquid flow path fluidly connected to the inlet manifold and the outlet manifold to direct a liquid flow between the inlet manifold and the outlet manifold in heat exchange relation to the cooling fluid flow. The condenser also includes a gas outlet fluidly connected to the outlet manifold to permit the non-condensed gas to exit the condenser and a liquid outlet fluidly connected to one of the manifolds to permit the condensed liquid to exit the air cooled condenser.

According to one feature, the liquid flow path includes a plurality of passes.

According to one feature, the vertical inlet manifold has an upper portion and a lower portion while the vertical outlet manifold has an upper and a lower portion and the condenser further includes a liquid level separating the upper portions from the lower portions in each of the manifolds.

According to one feature, the condenser is a cathode exhaust condenser for separating a cathode exhaust into a condensed liquid and a non-condensed gas.

According to one feature, the liquid outlet comprises a stand pipe.

According to one feature, the vertical location of the liquid level is defined by a vertical height of the stand pipe.

According to one feature, the liquid outlet is located at the outlet manifold.

According to one feature, the condenser further includes a baffle with an opening defining a gas bleed located in the lower portion of the inlet manifold.

In accordance with one feature, the gas flow path comprises a first plurality of tubes and the liquid flow path comprises a second plurality of tubes located below the first plurality of tubes.

According to one feature, the liquid flow path is divided by at least one baffle in one of the manifolds to provide a plurality of passes.

In accordance with one feature, a method is provided for separating a fluid mixture into a condensed liquid and a non-condensed gas in a condenser including the steps of:

flowing the fluid mixture into an inlet manifold;

separating the fluid mixture into a gas flow and a liquid flow in the inlet manifold;

cooling the liquid flow by flowing the liquid flow through a liquid flow path to an outlet manifold;

condensing at least a portion of the gas flow into condensed liquid by flowing the gas flow through a gas flow path to the outlet manifold;

again separating condensed liquid from the non-condensed gas in the outlet manifold;

directing the non-condensed gas out of the condenser through a gas outlet; and directing the condensed liquid out of the condenser through a liquid outlet.

In accordance with one feature, the method further includes, prior to directing the condensed liquid through the liquid outlet, the step of flowing the condensed liquid through a subcooling flow path extending between the inlet manifold and the outlet manifold.

Other objects, advantages, and features will become apparent from a complete review of the entire specification, including the appended claims and drawings.

DETAILED DESCRIPTION OF THE PREFERRED EMBODIMENTS

Figure 1:
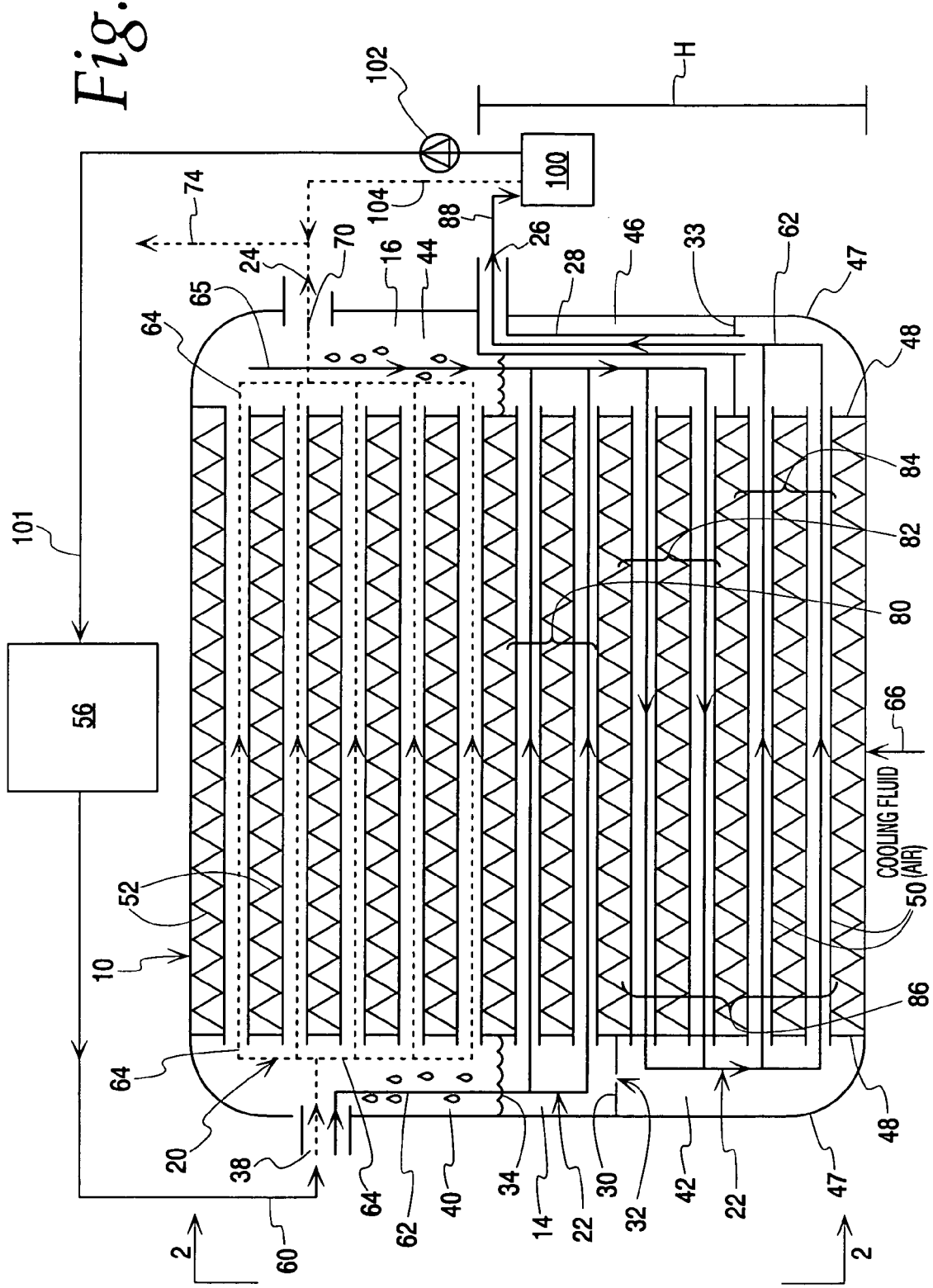
FIG. 1 is a somewhat diagrammatic elevation view of a condenser embodying the present invention as used with a fuel cell system.
Figure 2:
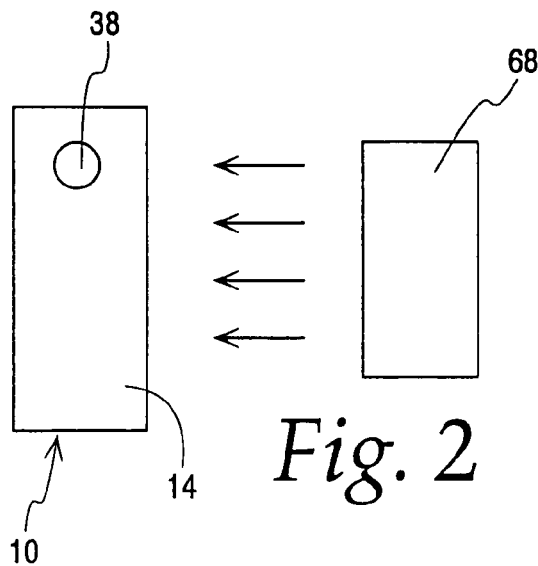
FIG. 2 view taken along line 2-2 of FIG. 1.

While the present invention is susceptible of embodiment in many different forms, there is shown in the drawing and will be described herein in detail specific embodiments thereof with the understanding that the present disclosure is to be considered as an exemplification of the principles of the invention and is not intended to limit the invention to the specific embodiments illustrated.

Referring to FIG. 1, a condenser 10 is provided for condensing and separating a fluid mixture into a condensed liquid and a non-condensed gas. The condenser 10 includes a vertical inlet manifold 14, a vertical outlet manifold 16, a gas flow path 20, a liquid flow path 22, a gas outlet 24 and a liquid outlet 26. The condenser 10 also includes a stand pipe 28 in the outlet manifold 16, a baffle 30 in the inlet manifold 14, a gas bleed 32 located on the baffle 30, another baffle 33 in the outlet manifold 16 and a liquid seal or level 34. The gas flow path 20 is fluidly connected to the inlet manifold 14 and the outlet manifold 16 to direct a gas flow from the inlet manifold 14 to the outlet manifold 16 in heat exchange relation to a cooling fluid flow such as a cooling air flow. Similarly, a liquid flow path 22 is fluidly connected to the inlet manifold 14 and the outlet manifold 16 to direct a liquid flow between the inlet manifold 14 and the outlet manifold 16 in heat exchange relation to the cooling fluid flow. In the illustrated embodiment, as seen in FIG. 1, the gas outlet 24 and liquid outlet 26 are each fluidly connected to the outlet manifold 16.

The inlet manifold 14 includes an inlet 38, an upper portion 40 and a lower portion 42 separated by the liquid level 34. The outlet manifold 16 includes an upper portion 44 and a lower portion 46 separated by the liquid level 34.

The specific materials and construction of the condenser 10 will be highly dependent on the parameters of each application, such as, for example, the fluids involved, the fluid temperatures and the fluid pressures.

The inlet manifold 14 and the outlet manifold 16 may take any suitable form, many of which are known. For example, one or both of the manifolds 14 and 16 may take the form of a tank 47 and header plate 48 or, by way of further example, as a one piece cylindrical header (not shown). The manifolds 14 and 16 may be constructed of a variety of materials such as aluminum, stainless steel, other alloys or other materials known by those skilled in the art as suitable for condensers. The baffles 30 and 33 may also be of any suitable design, many of which are known, that is compatible with the construction of the associated manifold 14, 16, and maybe made of similar material as the manifolds 14 and 16.

The gas flow path 20 and liquid flow path 22 may also take any suitable form. For example, one or both of the flow paths 20 and 22 may take the form of flat tubes, round tubes, plate pairs or the like known to those skilled in the art. As seen in FIG. 1, the gas flow path 20 and the liquid flow path 22 are provided in the form of flat tubes 50 with an upper group of tubes 50 defining the gas flow path 20 and a lower group of tubes 50 defining the liquid flow path 22. The flow paths 20 and 22 may be constructed of a variety of materials such as aluminum, stainless steel, other alloys or other materials known by those skilled in the art as suitable for use in condensers. Serpentine fins 52 are provided between each of the tubes 50 to provide a heat transfer surface between the flow paths 20 and 22 and a cooling fluid, in the form of air or other suitable cooling fluid such as water or glycol solutions. The fins 52 may take other suitable forms, such as plate fins or spiral wound fins, and may also include surface augmentation (not shown) to increase the heat transfer.

Figure 3:
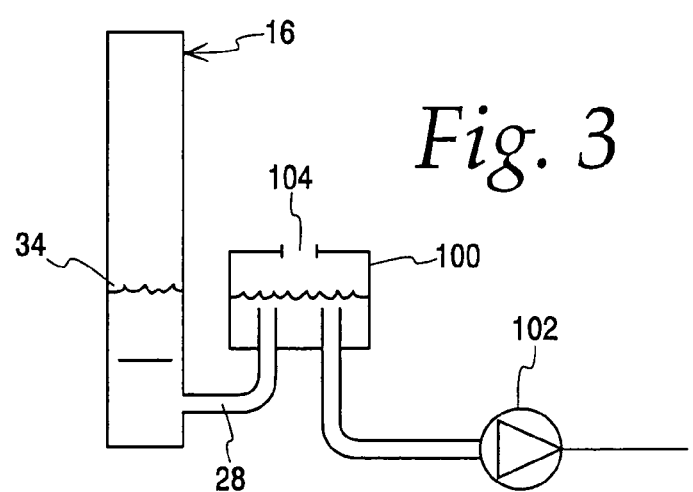
FIG. 3 is a somewhat diagrammatic elevation view showing an alternate configuration for an outlet manifold and liquid level apparatus for a condenser embodying the present invention.
Figure 4:
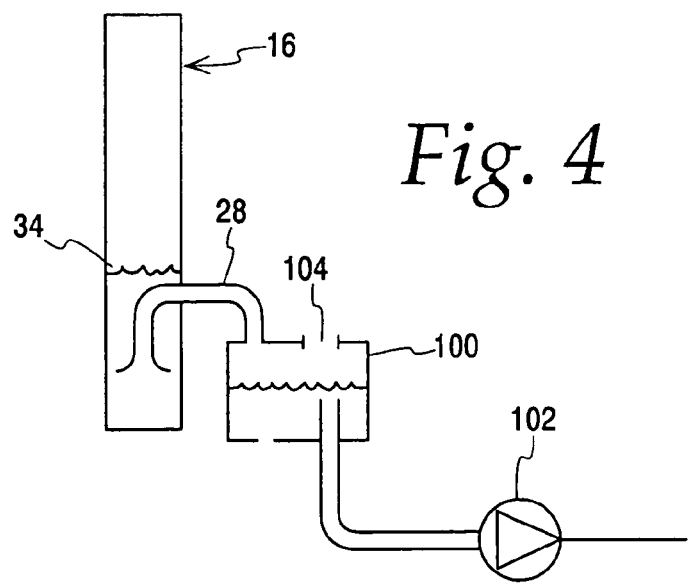
FIG. 4 is similar to FIG. 3, showing yet another alternative liquid level apparatus for a condenser embodying the present invention.

As seen in FIG. 1, the stand pipe 28 is shown inside the outlet manifold 16. However, it should be understood that the stand pipe 28 may be any suitable apparatus to control the liquid level in the manifold 16 to the desired level, such as for example shown in FIGS. 3 and/or 4, and may also be on the outside of the outlet manifold 16. Additionally, the stand pipe 28 or other suitable apparatus may be adjustable so as to adjust the relative sizes of the upper and lower portions 40, 44 and 42, 46 as will be discussed below. The stand pipe 28 also may be constructed of suitable materials such as aluminum, stainless steel, other alloys or other materials known by those skilled in the art as suitable for condensers.

The inlet 38, the gas outlet 24 and the liquid outlet 26 may take the form of any suitable port or connection for the respective flows. For example, the inlet 38 should be suitable for a fluid connection having a combined gas and liquid flow at an elevated temperature, while the gas outlet 24 should be suitable for a gas flow, and the liquid outlet 26 should be suitable for a liquid flow. Many suitable ports or connections are well known to those skilled in the art.

The operation of the condenser 10 will be discussed in greater detail below in connection with a fuel cell system 56. The fuel cell system 56 will not be discussed in detail because fuel cell systems are well known and the specific details of such systems are not critical to an understanding of the invention.

The condenser 10 receives a fluid flow capable of being separated into a condensed liquid and a non-condensed gas. For example, in FIG. 1, the condenser 10 receives a cathode exhaust, illustrated by arrow 60, from the fuel cell 56. The cathode exhaust 60 may contain water in a liquid form as well as a vapor form in combination with air and other products of side reactions occurring in the fuel cell of the system 56. The cathode exhaust 60 enters the inlet manifold 14 via the inlet 38. As illustrated in FIG. 1, the cathode exhaust 60 contains both liquid water and gas. As the cathode exhaust 60 enters the inlet manifold 14, the cathode exhaust 60 is separated into a liquid flow, illustrated by arrow 62, and a gas flow, illustrated by arrow 64. The liquid flow 62 flows via gravity towards the lower portion 42 of the inlet manifold 14 while the gas flow 64 remains in the upper portion 40 of the inlet manifold 14.

The gas flow 64 flows from the inlet manifold 14 to the outlet manifold 16 via the gas flow path 20. While flowing through the gas flow path 20, the gas flow 64 is in heat exchange relationship with a cooling fluid flow, illustrated schematically by arrow 66, which may be provided by a blower 68. The cooling fluid flow 66 cools the gas flow 64 such that liquid will condense. When the gas flow 64 reaches the outlet manifold, additional condensed liquid flow 65 will separate via gravity and flow to the lower portion 46 of the outlet manifold 16. The remaining gas flow 64 will then exit the outlet manifold 16 as a non-condensed gas 70. The non-condensed gas 70 may then be released into the atmosphere, as illustrated by arrow 74.

The liquid flow 62 flows from the inlet manifold 14 to the outlet manifold 16 via the liquid flow path 22. While flowing through the liquid flow path 22, the liquid flow 62 is in heat exchange relationship with the cooling fluid flow 66 thereby cooling the liquid flow 62. After flowing through a first passage of the flow path 22, the liquid flow 62 enters the outlet manifold 16 and is combined with the additional condensed liquid flow 65 that was condensed in the gas flow path 20. As seen in FIG. 1, the liquid flow path 22 preferably includes the first pass 80, a second pass 82 and a third pass 84. After the liquid flow 62 is combined with the additional condensed liquid flow 65 from the gas flow path 20, the combined liquid flow 62 is further cooled by flowing through the second pass 82 to the inlet manifold 14 and then back through third pass 84 to the outlet manifold 16. Thus, the second pass 82 and the third pass 84 may be considered a subcooling flow path 86. After entering the outlet manifold 16 via the third pass 84, the liquid flow 62 exits the condenser 10 via the stand pipe 28 as a condensed liquid 88. The liquid flow 62 is directed through the liquid flow path 22 via the baffles 30 and 33. The gas bleed 32 is provided as an orifice in the baffle 30 between the first pass 80 and the second pass 82 to allow entrained gas in the liquid flow 62 to exit the liquid flow path 22 and join the gas flow 64. It should be understood that the gas bleed 32 may also be located at other positions in the liquid flow path 22, such as in baffle 33 in the outlet manifold 16.

It should be understood that the condenser 10 may operate with just one pass, such as the first pass 80 wherein the condensed liquid 88 exits the condenser 10, two passes 80 and 82 wherein the condensed liquid 88 exits with some subcooling, or may include more than three passes whereby the liquid flow 62 is further subcooled prior to exiting the condenser 10 as the condensed liquid 88. For example, if the liquid flow path 22 has only the first pass 80, the condensed liquid will exit the condenser 10 at the outlet manifold 16, whereas if the liquid flow path 22 has two passes such as the first pass 80 and the second pass 82, the condensed liquid 88 will exit via an outlet 26 in the condenser at the inlet manifold 14, preferably in the form of the stand pipe 28.

It should also be understood that, while a single pass is shown, the gas flow path 20 may include multiple passes similar to the multiple pass construction shown for the liquid flow path 22. In this regard, it may be desirable to provide baffles, such as the baffles 30 and 33 and for the baffles to include liquid bleed holes, similar to the gas bleed hole 32, to allow condensed liquid to bypass the tubes of each pass of the gas flow path 20.

The number of passes in each of the flow paths 20 and 22 is primarily determined by the pressure drop and heat duty requirements for the respective gas flow 64 and liquid flow 62 as determined by the system in which the condenser 10 is used. For example, in the illustrated embodiment, it may be desirable for each of the flow paths 20 and 22 to have similar pressure drops and to account for about 50% of the heat load, respectively, while in other systems, it may be desirable for the pressure drops to be substantially different for each of the flows 64 and 62 and/or for the heat load requirements to also be substantially different.

The liquid level 34, and subsequently the relative locations of the upper portions 40, 44, the lower portions 42, 46, and the number of tubes in each of the flow paths 20 and 22 are determined by the stand pipe 28. The liquid level 34 is approximately the same vertical height as the liquid outlet 26 of the stand pipe 28 as indicated by the vertical height H. (Note that the fuel cell 56 is not actually located vertically above the condenser 10, but is merely a diagrammatic representation shown for the purpose of the flow diagram) The liquid level 34 is controlled by the stand pipe 28 because gravity will cause the liquid level 34 to become approximately equal to a vertical height of the liquid outlet 26 in the stand pipe 28, seen in FIG. 1 as the height H. It should be understood by those skilled in the art that the level H may be located at different vertical heights depending upon each application. Preferably, the height H is such that each of the flow paths 20 and 22 will account for the fractions of heat load for condensing and cooling liquid and for cooling the gas while achieving the required pressure drops and, as discussed above, will depend on the requirements of each particular system.

From the outlet 26, the condensed liquid 88 maybe stored in a tank 100 prior to entering the fuel cell 56 via a flow path or conduit 101. The use of a tank 100 will typically require a pump 102 to return the condensed liquid 88 to the fuel cell 56 and the tank would preferably be vented to atmosphere or to the cathode gas line via a vent or line 104. The condensed liquid 88 may be used in the fuel cell as a coolant in the fuel cell 56, for humidification of the anode or cathode, as part of a fuel processing subsystem (not shown), or other purposes known by those skilled in the art.

In the embodiment illustrated in FIG. 1, the gas flow path 20 comprises a plurality of the tubes 50, while the liquid flow path 22, located below the gas flow path 20, also comprises a plurality of the tubes 50. The gas flow path 20 is illustrated as having only a single pass in a single direction. By using multiple tubes 50 in a single pass as opposed to multiple passes, the gas is allowed to flow relatively freely without much restriction. Preferably, this is accomplished by maximizing the flow area to reduce the velocity of the gas flow 64 and by minimizing the flow length. This configuration is useful in applications requiring minimal pressure drops for the gas. Specifically, in an application condensing a cathode exhaust, the pressure drop needs to be minimized to reduce parasitic power losses. If the pressure losses are too great, additional pumps may be required to pump the gas flow, which consumes power produced by the fuel cell 56. However, multiple passes may be useful in condensers that do not require minimizing pressure drops in the gas flow 64.

Figure 5:
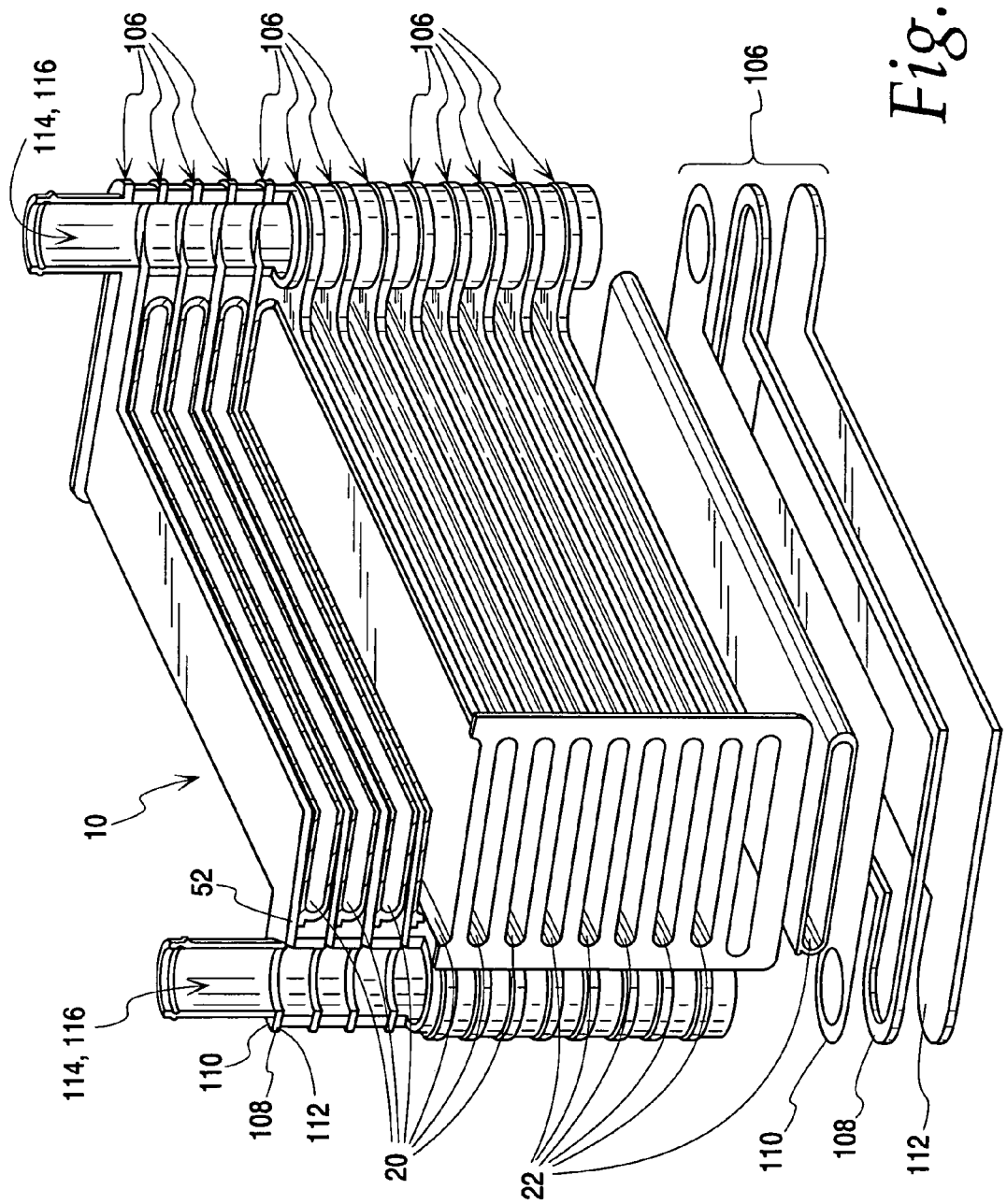
FIG. 5 is an exploded, cut away perspective view showing an alternate embodiment of a condenser embodying the present invention wherein the coolant flow paths are enclosed.

An alternate embodiment of the condenser 10 is shown in FIG. 5 with the inlet and outlet manifolds 14 and 16 not shown and with like numbers indicating like components. The embodiment of FIG. 5 differs from that of FIG. 1 in that the flow paths for the cooling fluid are enclosed, rather than open, with the fins 52 or other suitable surface augmentation enclosed between a suitable heat exchange unit 106, such as a bar plate construction with a bar or frame 108 sandwiched between a pair of plates 110, 112 to define the flow path for the coolant fluid between a coolant inlet manifold 114 defined by the stacked plates 110, 112 and a coolant outlet manifold 116 defined by the stacked plates 110, 112.

It should be understood that as used herein, the term gas flow is intended to mean a flow that is entirely gas or predominantly gas with some entrained liquid. Similarly, as used herein, the term liquid flow is intended to mean a flow that is entirely liquid or predominantly liquid with some entrained gas.

It should be understood that while the condenser 10 is described herein as particularly advantageous for use in fuel cell systems, the condenser 10 may find use in any number of systems desiring separation of a liquid flow from a gas flow and further condensing the gas flow and cooling the liquid flow. Accordingly, no limitation to use with fuel cell systems or cathode exhaust flows is intended unless specifically recited in the claims.

The invention claimed is:

1. A condenser for separating a fluid mixture into a condensed liquid and a non-condensed gas comprising:
   a vertical inlet manifold to receive the gas mixture;
   a vertical outlet manifold;
   a gas flow path fluidly connected to the inlet manifold and the outlet manifold to direct a gas flow from the inlet manifold to the outlet manifold in heat exchange relation to a cooling fluid flow;
   a liquid flow path fluidly connected to the inlet manifold and the outlet manifold to direct a liquid flow in multiple passes between the inlet manifold and the outlet manifold in heat exchange relation to the cooling fluid flow;
   a gas outlet fluidly connected to the outlet manifold to permit the non-condensed gas to exit the condenser; and
   a liquid outlet fluidly connected to one of the manifolds to permit the condensed liquid to exit the condenser.

2. The condenser of claim 1 wherein the liquid outlet is a stand pipe having a vertical height that defines a liquid level in both of the manifolds.

3. The condenser of claim 1 wherein the liquid outlet is located at the outlet manifold.

4. The condenser of claim 1 wherein the vertical inlet manifold receives the gas mixture and has an upper portion and a lower portion, the vertical outlet manifold receives the condensed liquid and the non-condensed gas and has an upper portion and a lower portion, and a liquid level separates the upper portion from the lower portion in each of the manifolds.

5. The condenser of claim 1 further comprising a baffle with an opening defining a gas bleed located in a lower portion of the inlet manifold.

6. The condenser of claim 1 wherein the gas flow path comprises a first plurality of tubes and the liquid flow path comprises a second plurality of tubes located below the first plurality of tubes.

7. The condenser of claim 6 wherein the liquid flow path is divided by at least one baffle in one of the manifolds to provide a plurality of passes.

8. The condenser of claim 7 further comprising another baffle with an opening defining a gas bleed located in a lower portion of the inlet manifold.

9. A cathode exhaust gas condenser for use in a fuel cell system for separating a cathode exhaust into a condensed liquid and a non-condensed gas comprising:
   a vertical inlet manifold to receive the cathode exhaust;
   a vertical outlet manifold;
   a cathode exhaust flow path fluidly connected to the inlet manifold and the outlet manifold to direct a gas flow from the inlet manifold to the outlet manifold in heat exchange relation to a cooling fluid flow;
   a liquid flow path fluidly connected to the inlet manifold and the outlet manifold to direct a liquid flow in multiple passes between the inlet manifold and the outlet manifold in heat exchange relation to the cooling fluid flow;
   a gas outlet fluidly connected to the outlet manifold to permit the non-condensed gas to exit the condenser; and
   a liquid outlet fluidly connected to one of the manifolds to permit the condensed liquid to exit the condenser.

10. The condenser of claim 9 wherein the liquid outlet is a stand pipe having a vertical height that defines a liquid level in both of the manifolds.

11. The condenser of claim 9 wherein the liquid outlet is located at the outlet manifold.

12. The condenser of claim 9 wherein the vertical inlet manifold receives the gas mixture and has an upper portion and a lower portion, the vertical outlet manifold receives the condensed liquid and the non-condensed gas and has an upper portion and a lower portion, and a liquid level separates the upper portion from the lower portion in each of the manifolds.

13. The condenser of claim 9 further comprising a baffle with an opening defining a gas bleed located in the lower portion of an inlet manifold.

14. The condenser of claim 9 wherein the gas flow path comprises a first plurality of tubes and the liquid flow path comprises a second plurality of tubes located below the first plurality of tubes.

15. The condenser of claim 14 wherein the liquid flow path is divided by at least one baffle in one of the manifolds to provide a plurality of passes.

16. The condenser of claim 15 further comprising another baffle with an opening defining a gas bleed located in the lower portion of an inlet manifold.

17. A condenser for separating a fluid mixture into a condensed liquid and a non-condensed gas comprising:
   a vertical inlet manifold to receive the gas mixture and having an upper portion and a lower portion;
   a vertical outlet manifold to receive the condensed liquid and the non-condensed gas and having an upper portion and a lower portion;
   a liquid level separating the upper portion from the lower portion in each of the manifolds;
   a gas flow path fluidly connected to the inlet manifold and the outlet manifold to direct a gas flow from the inlet manifold to the outlet manifold in heat exchange relation to a cooling fluid flow;

a liquid flow path fluidly connected to the inlet manifold and the outlet manifold to direct a liquid flow from the inlet manifold to the outlet manifold in heat exchange relation to the cooling fluid flow;

a gas outlet fluidly connected to the gas flow path to permit the non-condensed gas to exit the condenser; and a liquid outlet fluidly connected to the liquid flow path to permit the condensed liquid to exit the condenser.

18. The condenser of claim 17 wherein the liquid outlet comprises a stand pipe, the vertical location of the liquid level being defined by the vertical height of the stand pipe.

19. The condenser of claim 17 wherein the liquid outlet is located at the outlet manifold.

20. The condenser of claim 17 wherein the liquid flow path comprises multiple passes.

21. The condenser of claim 20 further comprising a baffle with an opening defining a gas bleed located in the lower portion of the inlet manifold.

22. The condenser of claim 17 wherein the gas flow path comprises a first plurality of tubes and the liquid flow path comprises a second plurality of tubes located below the first plurality of tubes.

23. The condenser of claim 22 wherein the liquid flow path is divided by at least one baffle in one of the manifolds to provide a plurality of passes.

24. The condenser of claim 23 further comprising another baffle with an opening defining a gas bleed located in the lower portion of the inlet manifold.

25. A cathode exhaust condenser for use in a fuel cell system for separating a cathode exhaust into a condensed liquid and a non-condensed gas comprising:

a vertical inlet manifold to receive the cathode exhaust and having an upper portion and a lower portion;

a vertical outlet manifold to receive the condensed liquid and the non-condensed gas and having an upper portion and a lower portion;

a liquid level separating the upper portion from the lower portion in each of the manifolds;

a gas flow path fluidly connected to the inlet manifold and the outlet manifold to direct a gas flow from the inlet manifold to the outlet manifold in heat exchange relation to a cooling fluid flow;

a liquid flow path fluidly connected to the inlet manifold and the outlet manifold to direct a liquid flow from the inlet manifold to the outlet manifold in heat exchange relation to the cooling fluid flow;

a gas outlet fluidly connected to the gas flow path to permit the non-condensed gas to exit the condenser; and a liquid outlet fluidly connected to the liquid flow path to permit the condensed liquid to exit the condenser.

26. The condenser of claim 25 wherein the liquid outlet comprises a stand pipe, the vertical location of the liquid level being defined by the vertical height of the stand pipe.

27. The condenser of claim 25 wherein the liquid outlet is located at the outlet manifold.

28. The condenser of claim 25 wherein the liquid flow path comprises multiple passes.

29. The condenser of claim 28 further comprising a baffle with an opening defining a gas bleed located in the lower portion of the inlet manifold.

30. The condenser of claim 25 wherein the gas flow path comprises a first plurality of tubes and the liquid flow path comprises a second plurality of tubes located below the first plurality of tubes.

31. The condenser of claim 30 wherein the liquid flow path is divided by at least one baffle in one of the manifolds to provide a plurality of passes.

32. The condenser of claim 31 further comprising another baffle with an opening defining a gas bleed located in the lower portion of the inlet manifold.

33. A method for separating a fluid mixture into a condensed liquid and a non-condensed gas in a condenser, the method comprising the steps of:

flowing the fluid mixture into an inlet manifold;

separating the fluid mixture into a gas flow and a liquid flow in the inlet manifold;

cooling the liquid flow by flowing the liquid flow through a liquid flow path to an outlet manifold;

condensing at least a portion of the gas flow into condensed liquid by flowing the gas flow through a gas flow path to the outlet manifold;

again separating condensed liquid from non-condensed gas in the outlet manifold;

directing the non-condensed gas out of the condenser through a gas outlet; and directing the condensed liquid out of the condenser through a liquid outlet.

34. The method of claim 33 further comprising, prior to directing the condensed liquid through the liquid outlet, the step of flowing the condensed liquid through an additional pass extending between the inlet manifold and the outlet manifold.

* * * * *